Dec. 1, 1964 W. J. SIKMA 3,159,441
PORTABLE STORAGE MEANS
Filed Dec. 21, 1961 4 Sheets-Sheet 1

INVENTOR.
WILLIAM J. SIKMA
BY
Ooms, McDougall and Hersh
ATT'YS.

INVENTOR.
WILLIAM J. SIKMA
ATT'YS.

Dec. 1, 1964 W. J. SIKMA 3,159,441
PORTABLE STORAGE MEANS
Filed Dec. 21, 1961 4 Sheets-Sheet 4
FIG. 6
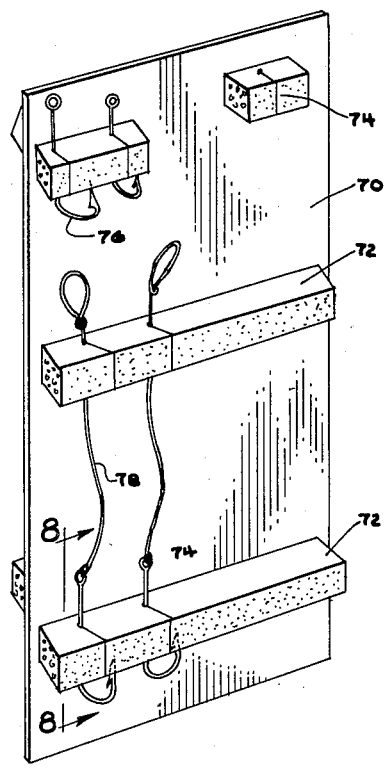
FIG. 7
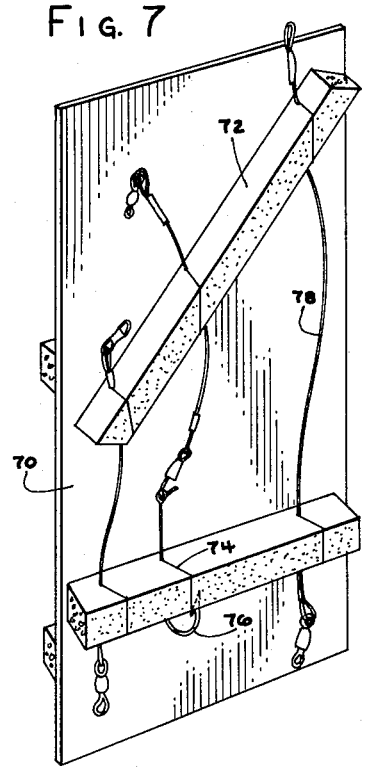
FIG. 9
FIG. 8
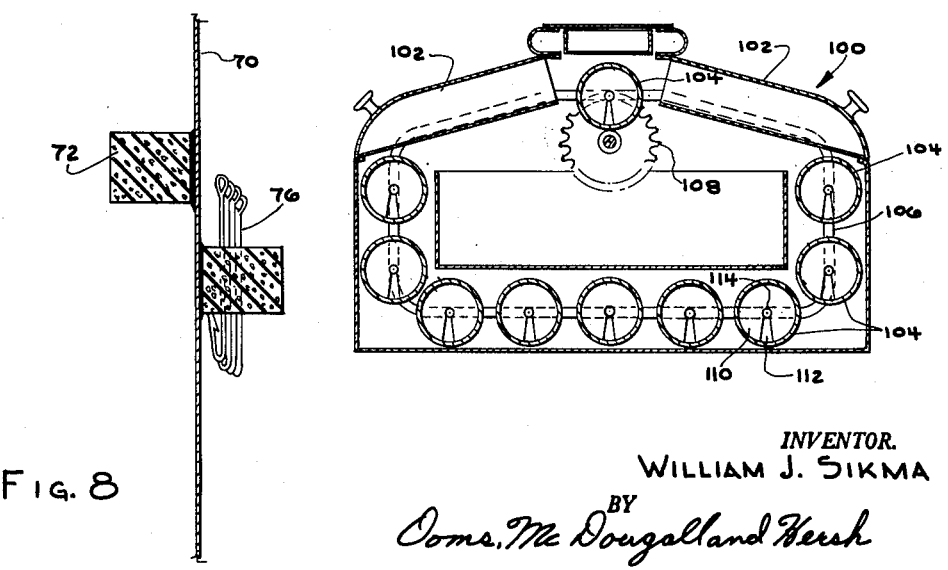
INVENTOR.
WILLIAM J. SIKMA
BY
Ooms, McDougall and Hersh
ATT'YS.

United States Patent Office 3,159,441
Patented Dec. 1, 1964

3,159,441
PORTABLE STORAGE MEANS
William J. Sikma, 10700 S. Wabash Ave., Chicago, Ill.
Filed Dec. 21, 1961, Ser. No. 161,215
3 Claims. (Cl. 312—268)

This invention relates to a portable storage means, and it relates more particularly to improved means for storing and handling a large variety of articles. The apparatus of this invention is designed for compactness but is nevertheless capable of holding a large variety of equipment and is adapted to carry this equipment in a manner which is particularly convenient for the user. In order to simplify the following description, reference will be made to the storage and handling of fishing gear, since this type of gear comprises a wide variety of articles and, therefore, characterizes most of the known problems. However, it will be understood that the apparatus described is intended for use in any capacity. For example, the container to be described can be employed as an ice cooler if provided with conventional insulation. Other non-limiting contemplated uses include doctors' kits, tool boxes, purses and sewing boxes.

There are various well known disadvantages associated with existing storage mechanisms and this is particularly true with respect to fishing tackle boxes and similar devices. Conventional units are either extremely bulky or do not provide sufficient space for carrying the great variety of articles which comprise fishing tackle. The means for opening the boxes usually involve great increase in the space taken up by the box and it is often very difficult to find articles within the boxes. A great deal of time and effort could be saved if the articles were distributed within the box in an efficient fashion. Furthermore, it is obviously desirable to provide a fishing tackle apparatus which does not take up a great deal of space when opened.

It is an object of this invention to provide a fishing tackle apparatus which is compact but which at the same time provides for the holding of a large variety of articles and which permits locating of these articles in a particularly convenient manner.

It is a further object of this invention to provide a fishing tackle apparatus which does not take up a great deal of space when opened and which provides means whereby the articles making up the fishing tackle are arranged in a convenient fashion.

It is a more particular object of this invention to provide a fishing tackle apparatus which includes a great variety of article holding means and which provides mechanisms whereby the various holding means can be presented to the user for easy access to the contents.

These and other objects of this invention will appear hereinafter and for purposes of illustration, but not of limitation, specific embodiments of this invention are shown in the accompanying drawings in which:

FIGURE 6 is a front perspective view of an improved holder for fish hooks and the like adapted to be employed in combination with this invention;

FIGURE 7 is a rear perspective view of the holder shown in FIGURE 6;

FIGURE 8 is an enlarged fragmentary sectional view taken about the line 8—8 of FIGURE 6; and FIGURE 9 is an elevational view of an apparatus having compartments on two sides each characterized by the features of this invention.

Figures 1, 2:
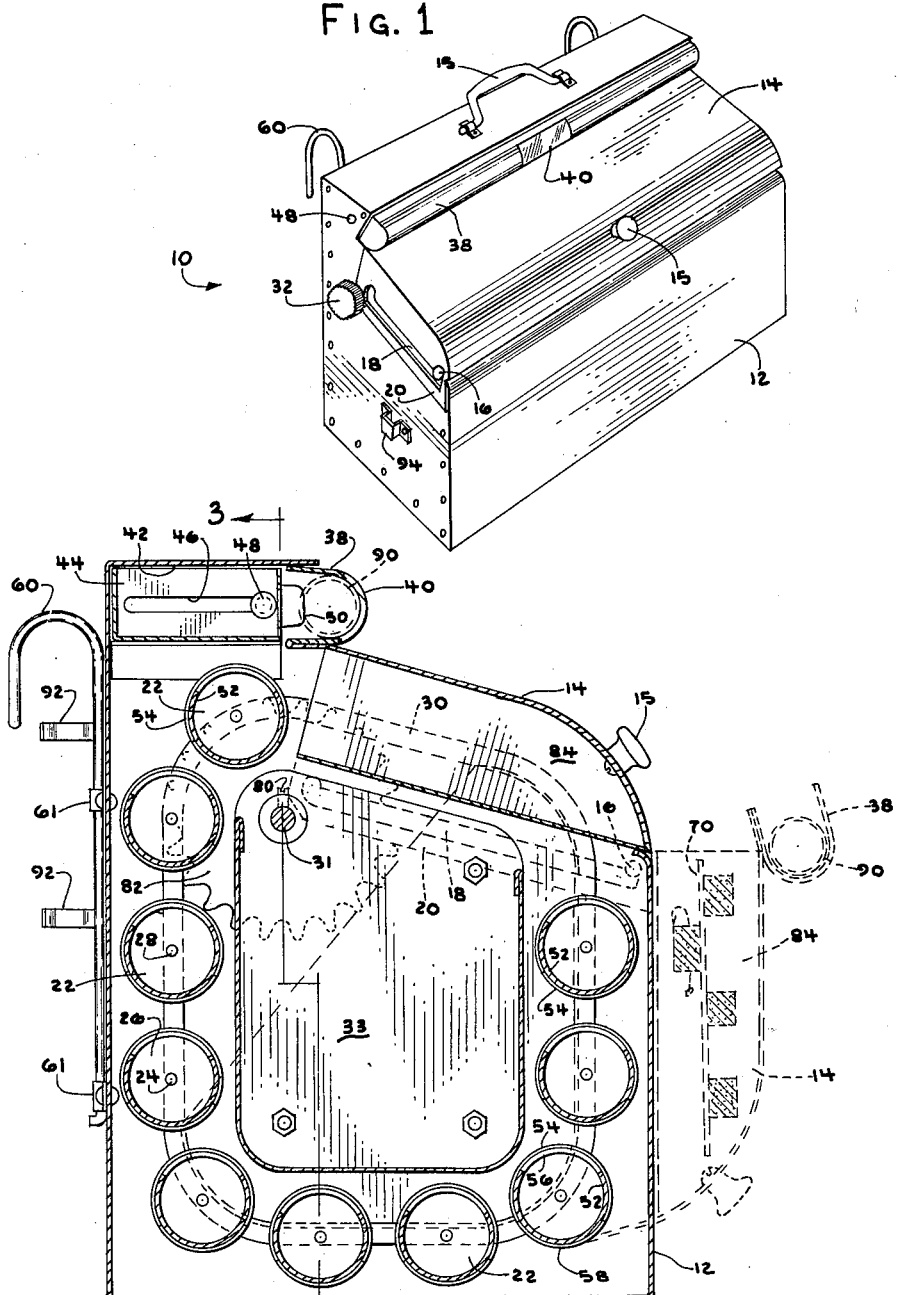
FIGURE 1 is a perspective view of an apparatus characterized by the features of this invention.
FIGURE 2 is an enlarged cross-sectional side elevation of the improved apparatus.

The apparatus of this invention includes a housing having a slidable cover for providing access to the interior of the housing. Several places within the housing are provided for holding various articles, and these include a plurality of holding means mounted within the housing and adapted to be rotated whereby they can be selectively introduced adjacent the uncovered portion of the housing. The holding means which are thus movably mounted within the housing preferably comprise inner and outer relatively rotatable cylindrical members. The outer member is formed of a transparent material and is provided with openings which dimensionally correspond with similar openings to the interior of the inner cylindrical member. By rotating the outer cylinder with respect to the inner cylinder, the openings to the interior can be shut off and, therefore, the cylinder assembly can be moved within the housing without spilling the contents of the inner cylinder. By providing a transparent outer cylinder, the user will always be able to see the contents as the various cylinders are selectively introduced to the housing opening.

The cylindrical article holding means are positioned around the periphery of the housing to provide a large central space for storing of additional articles. The cylinder assemblies are adapted to be rotated within the housing, for example, by connecting the cylinders to a chain engaging a rotatable sprocket. Alternatively, the respective cylinders can be mounted on a rotatable plate adapted to be driven from outside the housing.

The cover for the apparatus of this invention is mounted in such a manner that the apparatus takes up substantially the same space when open as when closed. The mounting means provides for swinging of the top cover into abutment with the front face of the housing to provide a compact structure in the open position. The slidable cover is hollow and is adapted to hold a unique retaining means to increase the versatility of the fishing tackle apparatus. The retaining means of this invention is particularly designed for holding fish hooks and the like, and includes a thin sheet having a plurality of flexible slitted means thereon. The fish hooks, leaders or other similar articles are adapted to be resiliently positioned on the improved retaining means and the retaining means is adapted to be associated with the slidable cover.

An additional compartment in the tackle apparatus is positioned on the top of the housing at the rear thereof. A tray is adapted to be slidably received within this additional compartment and the tray, in addition to providing space for holding additional articles, has included therein a light and battery. A closure means for the tray secured to the rear of the slidable cover is provided within an aperture whereby the light within the tray will shine outside the housing when the housing is closed. Furthermore, the provision of this light greatly facilitates viewing of the tackle box contents when the cover is pulled back.

The accompanying drawings will provide a more complete description of an apparatus including the concepts of this invention. The apparatus 10 shown is composed of the housing 12 having a slidable cover 14 adapted to be pulled back by means of the handle 15. Pins 16 secured to the housing 12 cooperate with the slots 18 formed in the side wall of the cover to guide the slidable movement of the cover. Cylindrical article holding means 22 are provided for rotation within the housing 12.

Figure 3:
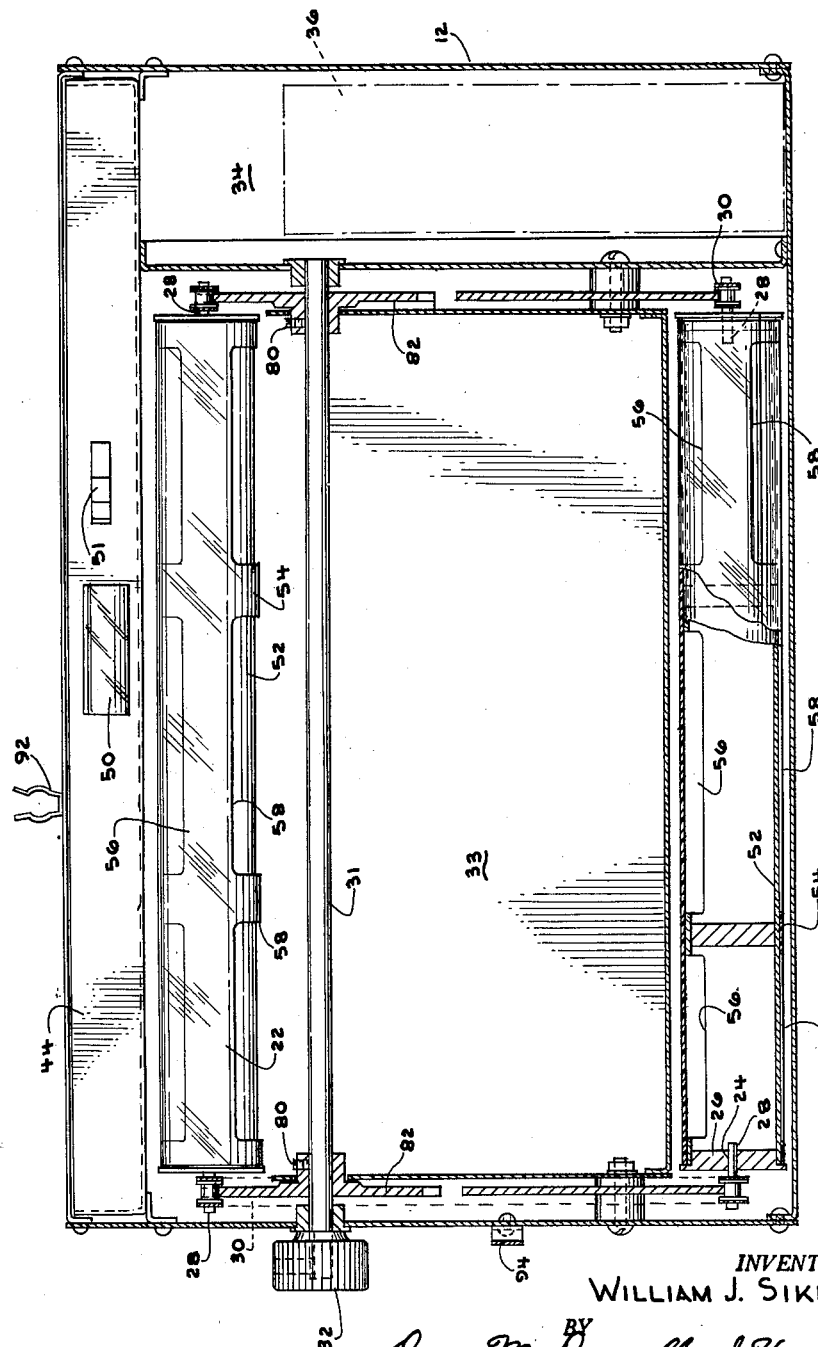
FIGURE 3 is a cross-sectional front elevation taken about the line 3—3 of FIGURE 2.

The cylindrical means are provided with holes 24 in their end walls 26 whereby the cylinders can be mounted on pintles 28 located on the drive chain 30 (FIGURES 2 and 3). A shaft 31 connected to knob 32 is secured by means of set screws 80 to sprockets 82. In this manner the article holding means 22 can be rotated within the housing by means of the knob 32 disposed outside the housing. It will be obvious that a large compartment 33 is disposed among the cylinders 22 and that access to the area is provided by the absence of cylinders 22 on a specific length of the chain 30.

The cover 14 is provided at its upper edge with a closure member 38. An aperture 40 formed in the closure member is disposed centrally of a receptacle 42 formed above the housing 12. The receptacle 42 is adapted to receive a tray 44 which is slidably mounted within the receptacle by means of the tray slots 46 and cooperating pins 48 extending inwardly from the walls of the receptacle 42. A battery operated light 50 is secured to the front face of the tray 44 directly opposite the aperture 40. It will be apparent that light will be transmitted through the aperture 40 when the cover is closed, whereas light will be available to the interior of the housing 12 when the cover is open. A switch 51, located on the front face of tray 44, is provided for convenient operation of the light 50.

The article holding means 22 above noted include an inner hollow cylinder 52 and an outer transparent plastic sleeve 54. The inner cylinder 52 is provided with at least one access opening 56 whereas similar openings 58 are formed in the outer sleeve 54. It will be apparent that rotation of the outer sleeve with respect to the inner sleeve will alternately open and close the openings 56. Articles can be stored within the various cylinders and the access openings 56 closed off. There will be no danger of spilling the contents during the rotation of the cylinders 22, but at the same time the contents of the cylinders will at all times be visible.

In the use of the described apparatus it is many times desirable to provide for stationary positioning of the housing. For this purpose, hooks 60 are mounted on the back of the housing by means of the brackets 61. The hooks are rotatably fitted in the brackets and can be employed to fix the housing in a secure manner as on the side of a boat.

Figure 4:
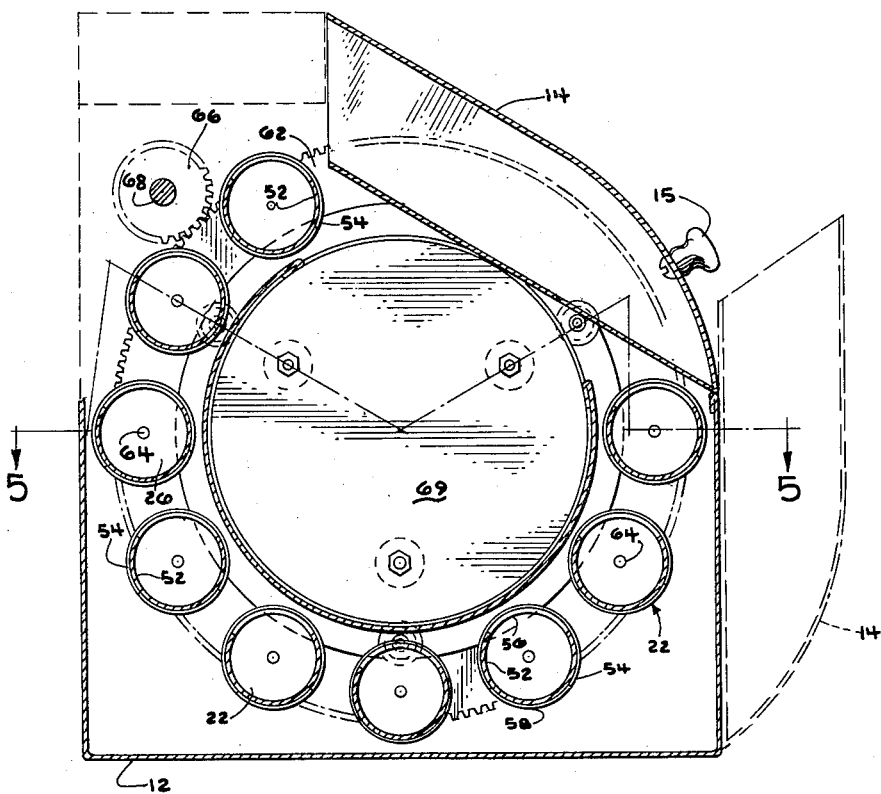
FIGURE 4 is a side elevation in section illustrating an alternative form of the present invention.
Figure 5:
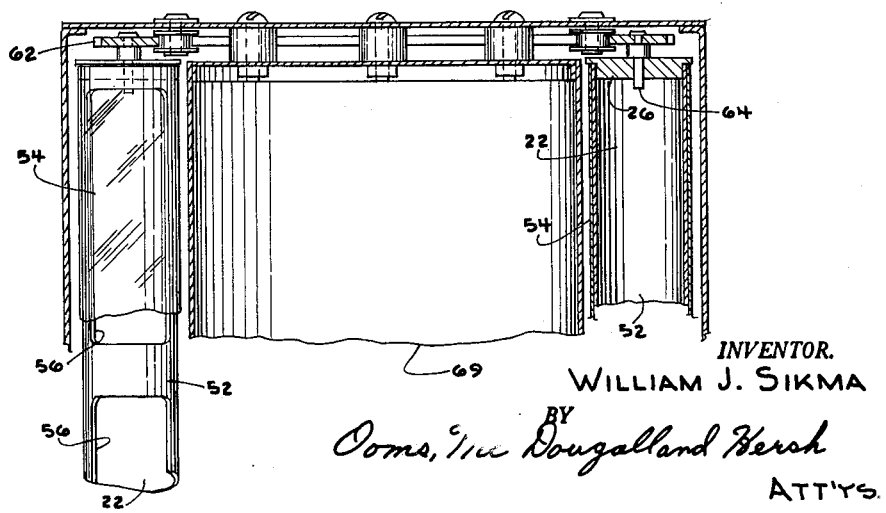
FIGURE 5 is a detail section taken about the line 5—5 of FIGURE 4.

FIGURES 4 and 5 illustrate an alternaitve mechanism for rotating the article holding means 22. The mechanism includes a rotary gear 62 having secured thereto pintles 64. The pintles fit into the ends 26 of the cylinders 22 in the manner previously described. Drive pinion 66 mounted on shaft 68 is adapted to be operated by means of a knob located outside the housing. It will be apparent that the rotation of pinion 66 will selectively introduce the cylinders 22 for access thereto from the outside the housing. An interior compartment 69 is provided for additional storage purposes. As previously noted, the cylinders 22 are spaced apart with respect to one area of the gear 62 to permit access to the chamber 69.

The shaft 68 may extend across the housing interior to drive a similar pinion and disc-like gear arrangement. It will be obvious, however, that the pintles 64 can transmit movement through the cylinders 22, the cylinders being mounted at their opposite ends on an idling disc-like member.

FIGURES 6 through 8 illustrate a retaining means for fish hooks and leaders. The retaining means comprises a sheet 70 having disposed thereon sponge, foam rubber or other resilient slitted means 72. The slits 74 formed in the means 72 are adapted to receive the hooks 76 and leaders 78 and to resiliently hold them. The entanglement of hooks, leaders and various fishing lines, etc., is a well known problem, and it will be obvious that the provision of the hooks in the fashion shown can largely avoid such problems. Furthermore, the space 84 (FIGURE 2) provided in the cover 14 enables locating of these retaining means in a simple fashion. With the retaining means located as shown, they are completely out of contact with other tackle and entanglement is largely avoided.

In order to provide more versatility in the tackle apparatus, additional storage space 34 (FIGURE 3) can be located at the side of the interior compartment 33. The space 34 is preferably designed for receiving standard size boxes 36 which conventionally are used as part of fishing gear. It will be obvious that any desired size can be employed and it will also be apparent that this compartment could be eliminated while retaining the other features of this invention.

FIGURE 9 illustrates an apparatus 100 which includes essentially all the described features but which provides a pair of slidable covers 102 for access to the interior. Cylindrical holding means 104 encompass the interior and can be driven by means of the chain 106 and sprocket 108. The figure also illustrates a means whereby the cylinders 104 can be easily removed. The ends 110 of the cylinders 104 are formed with the key-hole slot 112 with the neck thereof slightly smaller than the diameter of the pintle 114. The end 110 can snap over the pintle and be held thereon and can be easily removed. This feature is preferably incorporated in all of the cylinders.

Various other features can be incorporated into the box construction, such as the provision of a holding means 90 within the closure 38. These holding means can be composed of a pair of cylinders such as the holding means 22 and two means 90 are preferably provided on either side of the aperture 40. Furthermore, clamps 92 can be secured to the back of the housing for resiliently holding a gaff hook or the like. A bracket 94 positioned on the side wall of the container can be used for suspending a worm box or similar article after removal from the tackle box. As an additional feature, the shaft 31 or 68 could be hollow and provided with removable knobs whereby flares and matches or similar articles could be stored for emergency purposes.

The cylindrical holding means 22 and 90 in particular provide many distinct advantages. A plurality of compartments can be provided in each of the cylinders, and intermingling of articles is thus avoided. The cylinder constructions described are preferably designed for easy removal whereby they can be separated from the container and the articles therein carried without the necessity of transporting the entire apparatus. Thus, a fisherman can carry particular lures, hooks, etc., while leaving the rest of his tackle undisturbed. The portability also allows for replacement of the cylinders, and the stores selling the replacements can incorporate fishing gear therein.

A further distinct advantage of the cylinders results due to the fact that they will provide air pockets if the box is dropped in the water. Since the cylinders provide a substantial air volume, there is no immediate danger of the tackle box sinking, and the contents of the cylinders will be protected.

It will be obvious that the tackle apparatus described is an unusually compact unit since the cover, even in the open position, does not increase the space taken up by the apparatus to any great degree. The apparatus described provides a great variety of compartments designed for the holding of the various diverse articles making up fishing gear, and has been designed to utilize all available space. The unit itself can be formed of light sheet aluminum in order to reduce the expense and increase the ease of handling of the apparatus. The various moving parts employed are all of a relatively simple mechanical nature and require little maintenance. In this connection, it will be noted that a completely hinge-free construction is provided.

Various other features of the invention obviously provide advantages over presently employed structures. The particular arrangement of the light bulb in the apparatus enables use thereof while the housing is closed, since the cover slants away from the aperture 40, or for viewing the contents of the housing with the cover open. The improved fish hook retaining means, as noted, is also believed to obviate many of the disadvantages of the prior art.

As previously noted, it is not intended to limit the disclosed construction to a fishing tackle apparatus although it is believed that this construction best illustrates the unique features of this invention.

It will be understood that various modifications can be made in the above described apparatus which provide the characteristics of this invention without departing from the spirit thereof, particularly as defined in the following claims.

I claim:

1. An apparatus of the type described comprising a housing, a slideable cover provided for access to said housing, a plurality of holding means including leading and trailing holding means and additional holding means disposed therebetween, said holding means being movably mounted within said housing, means for moving said holding means in a path adjacent the interior walls of said housing to thereby permit selective introduction of the holding means beneath said cover whereby articles contained in the holding means can be reached, said leading and trailing holding means being spaced-apart a distance sufficient to define an access opening, and a relatively large compartment defined inside the path of movement of said holding means, said compartment being accessible when said cover is opened and when the opening defined between said leading and trailing holding means is moved beneath said cover, and wherein said cover is permanently attached to said housing and is adapted to swing into abutment with the front face of said housing when in open position to provide a compact structure, said cover being provided with outer and inner walls and side walls forming a receiving space therein, and including a sheet, article retaining means comprising a flexible body disposed on said sheet and having slits formed therein for insertion of thin articles, said sheet and associated retaining means being fitted within said receiving space.

2. An apparatus of the type described comprising a housing, a slideable cover provided for access to said housing, a driving chain and a plurality of article holding means connected at either end to said driving chain, said driving chain and article holding means being mounted within said housing and including means for driving said chain and associated holding means, said driving means being accessible from the outside of said housing, said holding means each comprising a inner hollow cylinder having compartments and access openings to the interior thereof and a rotatably fitted outer transparent cylinder having similar openings, said outer cylinder being adapted to be rotated to close off said access openings in one position and to place the openings in the inner and outer cylinders in corresponding locations in a second position for providing access to said compartments, operation of said driving chain permitting movement of said holding means to positions beneath said cover whereby articles in said compartments can be reached, said apparatus also including a large compartment disposed inside the path of movement of said holding means and accessible through said cover.

3. An apparatus of the type described comprising a housing, a slidable cover provided for access to said housing, a plurality of article holding means movably mounted within said housing, means for moving said holding means for selectively introducing the holding means beneath said cover whereby articles in the holding means can be reached, a large compartment disposed inside the path of movement of said holding means and accessible through said cover, a receptacle horizontally disposed on the top of said housing behind said cover, a tray adapted to be slideably received within said receptacle, closure means having a light aperture therein secured at the rear of said cover and adapted to close-off the front of said receptacle, and a light and battery disposed within said tray behind said aperture.

References Cited in the file of this patent

UNITED STATES PATENTS

| 557,948 | Bever | Apr. 7, 1896 |
| 568,631 | Smith | Sept. 29, 1896 |
| 954,805 | Hitchcock | Apr. 12, 1910 |
| 1,077,043 | Darrow | Oct. 28, 1913 |
| 1,082,705 | Robinson | Dec. 30, 1913 |
| 1,597,092 | McTighe | Aug. 24, 1926 |
| 1,903,091 | Cooper | Mar. 28, 1933 |
| 2,201,411 | Smith | May 21, 1940 |
| 2,490,939 | Aldrich | Dec. 13, 1949 |
| 2,645,547 | Channer | July 14, 1953 |

FOREIGN PATENTS

| 310,773 | Switzerland | Jan. 14, 1956 |